United States Patent
Kitagawa

(10) Patent No.: US 7,613,086 B2
(45) Date of Patent: Nov. 3, 2009

(54) DISK DEVICE AND CONTROL METHOD FOR DISK DEVICE

(75) Inventor: Kazuto Kitagawa, Osaka (JP)

(73) Assignee: Funai Electric Co., Ltd., Osaka (JP)

(*) Notice: Subject to any disclaimer, the term of this patent is extended or adjusted under 35 U.S.C. 154(b) by 743 days.

(21) Appl. No.: 11/212,624

(22) Filed: Aug. 29, 2005

(65) Prior Publication Data

US 2006/0077804 A1    Apr. 13, 2006

(30) Foreign Application Priority Data

Aug. 30, 2004   (JP)   ............... P.2004-250692

(51) Int. Cl.
    *G11B 7/00*   (2006.01)
(52) U.S. Cl. ............... 369/47.17; 369/53.33
(58) Field of Classification Search ............... 369/44.29, 369/47.22, 47.1, 47.5, 47.51, 47.52, 47.53, 369/47.21, 47.17, 53.33
    See application file for complete search history.

(56) References Cited

U.S. PATENT DOCUMENTS 6,535,468 B2* 3/2003 Akiyama et al. ......... 369/47.52
6,747,924 B1* 6/2004 Muramatsu ............... 369/44.29
6,850,469 B2* 2/2005 Ogawa et al. ............ 369/47.22

FOREIGN PATENT DOCUMENTS

| JP | 2000-306246 | 11/2000 |
| JP | 2001-126261 | 5/2001 |
| JP | 2003-59055 | 2/2003 |

* cited by examiner

*Primary Examiner*—Nabil Z Hindi
(74) *Attorney, Agent, or Firm*—Morgan, Lewis & Bockius LLP

(57) ABSTRACT

A disk device includes: a rotating unit for rotating the optical disk; an optical pick-up for reading the information data recorded on the optical disk; a moving unit for moving the optical pick-up; a focus control unit for leading the focus of the optical pick-up; a tracking control unit for leading the tracking of the optical pick-up; and an adjusting unit for changing the setting value of an equalizer to adjust the equalizer, wherein: when the optical disk is loaded on the disk device, the optical pick-up is moved to the innermost periphery of the optical disk, the optical disk is rotated, the focus and the tracking are led, and the operation of the optical pick-up is raised; and the setting value of the equalizer is changed to adjust the equalizer at a position where the operation of the optical pick-up is raised.

7 Claims, 2 Drawing Sheets

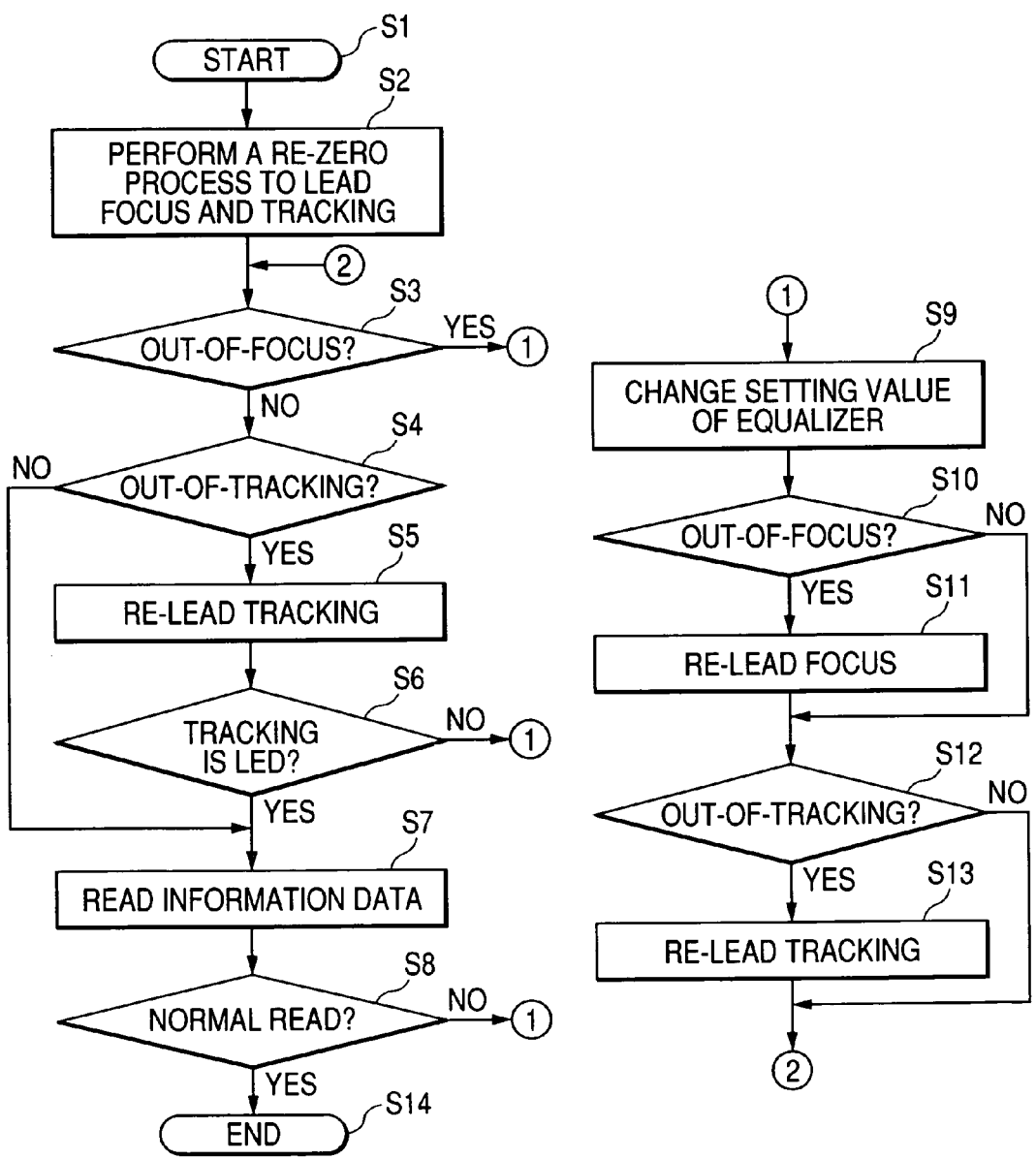

DISK DEVICE AND CONTROL METHOD FOR DISK DEVICE

BACKGROUND OF THE INVENTION

1. Field of the Invention

The present invention relates to a disk device for recording and reproducing information data on an optical disk such as a DVD (Digital Versatile Disk) or the like, and more particularly to a disk device that can rapidly adjust an equalizer of a signal processing circuit to a non-finalized disk.

2. Description of the Related Art

In an adjustment of an equalizer of a signal processing circuit of a disk device, TOC (Table of contents) recorded on an optical disk has been hitherto read by an optical pick-up, then, a preset address has been sought and the setting value of the equalizer of the signal processing circuit has been changed so that information data such as an address recorded in the address can be normally read to adjust the equalizer. However, when the optical disk loaded on the disk device is an optical disk such as a non-finalized disk on which the information data is not recorded in the preset address, even if the preset address is sought, the information data is not recorded in the address. Accordingly, the information data cannot be read. Thus, an address to be sought undesirably needs to be changed for each optical disk and the optical pick-up needs to be moved to an address in which the information data is recorded to adjust the equalizer of the signal processing circuit. As a background art, when an optical pick-up is moved to a target address to reproduce an address recorded on the target address, an out-of-focus state or an out of tracking state may be generated or the address may not be normally reproduced. In this case, the characteristics of an equalizer or the rotating speed of an optical disk is changed so that the target address recorded on the target address can be normally reproduced (see for instance, JP-A-2000-306246).

However, as described in the background art, when the optical pick-up is moved to the target address to reproduce the address recorded on the target address, if the out of focus state or the out-of tracking state is generated so that the address cannot be properly reproduced, the characteristics of the equalizer or the rotating speed of the optical disk can be changed to properly reproduce the target address recorded on the target address. However, in the case of the non-finalized disk in which the information data is not recorded in the preset address, even when the optical pick-up is moved to the preset address, the information data cannot be reproduced, because the information data is not recorded on the address. Accordingly, when the optical pick-up is not moved to other address in which the information data is recorded, the equalizer cannot be undesirably adjusted.

SUMMARY OF THE INVENTION

The present invention is proposed by considering the above-described problems of the background art and it is an object of the present invention to provide a disk device that can rapidly adjust an equalizer to a non-finalized disk in which information data is not recorded in a preset address.

To achieve the above-described object, a disk device for recording and reproducing information data on an optical disk according to the present invention includes: a rotating unit for rotating the optical disk at prescribed rotating speed; an optical pick-up for reading the information data recorded on the optical disk; a moving unit for moving the optical pick-up in the radial direction of the optical disk; a focus control unit for leading the focus of the optical pick-up to control the focus of the optical pick-up; a tracking control unit for leading the tracking of the optical pick-up to control the tracking of the optical pick-up; and an adjusting unit for changing the setting value of an equalizer to adjust the equalizer. When the optical disk is loaded on the disk device, the optical pick-up is moved to the innermost periphery of the optical disk, the optical disk is rotated at the prescribed rotating speed, the focus of the optical pick-up and the tracking of the optical pick-up are led, and the operation of the optical pick-up is raised, and the setting value of the equalizer is changed to adjust the equalizer at a position where the operation of the optical pick-up is raised.

When the out-of focus state of the optical pick-up is detected, the focus control unit re-leads the focus of the optical pick-up.

When the out-of tracking state of the optical pick-up is detected, the tracking control unit re-leads the tracking of the optical pick-up.

Thus, these units enable the equalizer to be rapidly adjusted to a non-finalized disk in which the information data is not recorded in a preset address.

In the disk device according to a first aspect of the invention, when an optical disk is loaded on the disk device, an optical pick-up is moved to the innermost periphery of an optical disk, the optical disk is rotate at a prescribed rotating speed, the focus of the optical pick-up and the tracking of the optical pick-up are led, and the operation of the optical pick-up is raised. When an out-of-focus state of the optical pick-up is detected, the focus of the optical pick-up is re-led. When an out-of-tracking state of the optical pick-up is detected, the tracking of the optical pick-up is re-led and the setting value of an equalizer is changed to adjust the equalizer at a position where the operation of the optical pick-up is raised. Accordingly, the setting value of the equalizer can be changed to rapidly adjust the equalizer even to a non-finalized disk in which information data is not recorded in a preset address.

In the disk device according to a second aspect of the invention, when an optical disk is loaded on the disk device, an optical pick-up is moved to the innermost periphery of the optical disk, the optical disk is rotated at a prescribed rotating speed, the focus of the optical pick-up and the tracking of the optical pick-up are led, and the operation of the optical pick-up is raised. The setting value of an equalizer is changed to adjust the equalizer at a position where the operation of the optical pick-up is raised. Accordingly, the setting value of the equalizer can be changed to rapidly adjust the equalizer even to a non-finalized disk in which information data is not recorded in a preset address.

In the disk device according to a third aspect of the invention, when the out-of focus state of the optical pick-up is detected, the focus of the optical pick-up is re-led. Accordingly, when the out-of focus state of the optical pick-up is detected, the focus of the optical pick-up is re-led and the setting value of the equalizer is changed at a position where the operation of the optical pick-up is raised so that the equalizer can be adjusted.

In the disk device according to a fourth aspect of the invention, when the out-of tracking state of the optical pick-up is detected, the tracking of the optical pick-up is re-led. Accordingly, when the out-of tracking state of the optical pick-up is detected, the tracking of the optical pick-up is re-led and the setting value of the equalizer is changed at a position where the operation of the optical pick-up is raised so that the equalizer can be adjusted.

In a control method for an optical disk device according to a fifth aspect of the invention, when an optical disk is loaded on the disk device, an optical pick-up is moved to the innermost periphery of the optical disk to rotate the optical disk at a prescribed rotating speed, lead the focus of the optical pick-up and the tracking of the optical pick-up and raise the operation of the optical pick-up. The setting value of an equalizer is changed to adjust the equalizer at a position where the operation of the optical pick-up is raised. Accordingly, the setting value of the equalizer can be changed to rapidly adjust the equalizer even to a non-finalized disk in which information data is not recorded in a preset address.

In the control method for an optical disk device according to a sixth aspect of the invention, when the out-of focus state of the optical pick-up is detected, the focus of the optical pick-up is re-led. Accordingly, when the out-of focus state of the optical pick-up is detected, the focus of the optical pick-up is re-led and the setting value of the equalizer is changed at a position where the operation of the optical pick-up is raised so that the equalizer can be adjusted.

In the control method for an optical disk device according to a seventh aspect of the invention, when the out-of tracking state of the optical pick-up is detected, the tracking of the optical pick-up is re-led. Accordingly, when the out-of tracking state of the optical pick-up is detected, the tracking of the optical pick-up is re-led and the setting value of the equalizer is changed at a position where the operation of the optical pick-up is raised so that the equalizer can be adjusted.

BRIEF DESCRIPTION OF THE DRAWINGS

These and other objects and advantages of this invention will become more fully apparent from the following detailed description taken with the accompanying drawings in which:

FIG. 3 is a flowchart showing the operation of the disk device of one embodiment of the present invention.

DETAILED DESCRIPTION OF THE PREFERRED EMBODIMENTS

Figure 1:
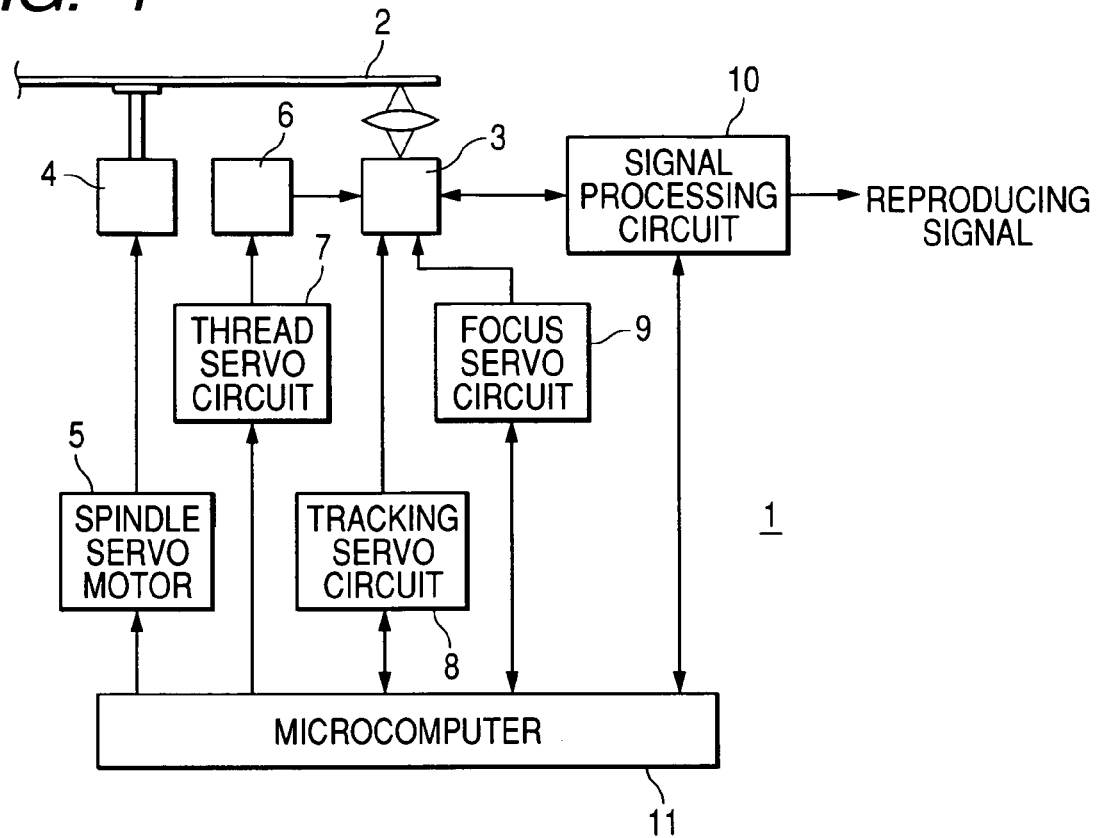
FIG. 1 is a block diagram showing the structure of a disk device according to one embodiment of the present invention.
Figure 2A:
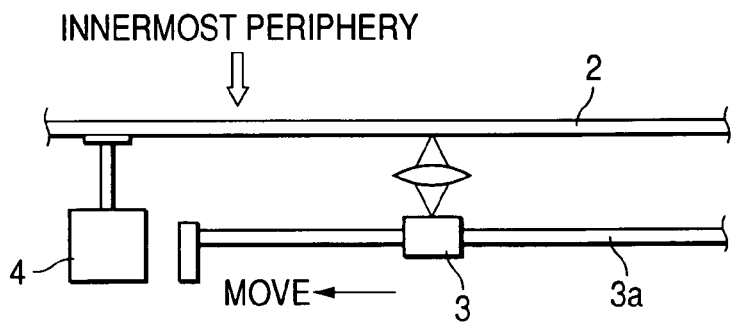
FIGS. 2A and 2B are explanatory views showing the operation of the disk device of one embodiment of the present invention.
Figure 2B:
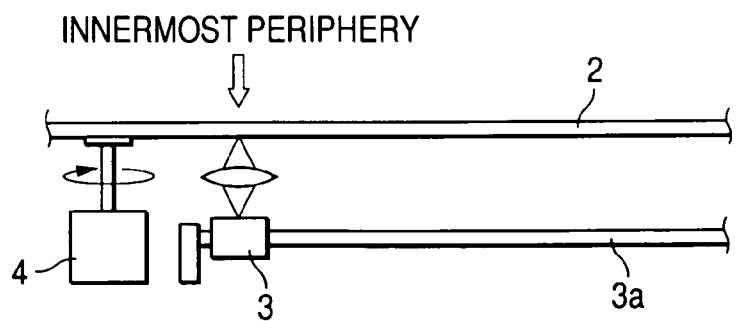

Now, properly referring to the drawings, a best mode for carrying out the present invention will be described in detail. FIG. 1 is a block diagram showing the structure of a disk device of one embodiment of the present invention. FIGS. 2A and 2B are explanatory views showing the operation of the disk device of one embodiment of the present invention. FIG. 3 is a flowchart showing the operation of the disk device of one embodiment of the present invention.

Initially, the present invention is described by referring to the block diagram showing the structure of the disk device according to one embodiment of the present invention in FIG. 1.

A disk device 1 includes an optical pick-up 3 for applying a laser beam to the recording surface of an optical disk 2 to record information data on the optical disk 2 and applying a laser beam on the optical disk 2 to detect its reflected light to read the information data recorded on the optical disk 2, a spindle motor 4 for rotating the optical disk 2, a spindle servo circuit 5 for driving the spindle motor 4 to servo-control the rotating speed of the optical disk 2, a thread motor 6 for moving the optical pick-up 3 in the radial direction of the optical disk 2, a thread servo circuit 7 for servo-controlling the rotating direction and the rotating speed of the thread motor 6, a tracking servo circuit 8 for servo-controlling the tracking of the optical pick-up 3 on the basis of a tracking error signal detected by the optical pick-up 3, a focus servo circuit 9 for servo-controlling the focus of the optical pick-up 3 on the basis of a focus error signal detected by the optical pick-up 3, a signal processing circuit 10 for synchronously detecting and demodulating the information data read by the optical pick-up 3 on the basis of a reference clock, correcting the error of the demodulated information data, expanding the information data compressed on the basis of a prescribed compressing system to decode and reproduce the information data, encoding the information data to compress the information data on the basis of a prescribed compressing system, and driving the optical pick-up 3 to record the information data on the optical disk 2, and a microcomputer 11 for controlling the entire part of a system of the disk device 1.

An operation of the disk device formed as described above will be described below.

When the disk device 1 is loaded with the optical disk 2, the microcomputer 11 transmits a control signal to the thread servo circuit 7 to perform a re-zero process for driving the thread motor 6 to move the optical pick-up 3 to the innermost periphery of the optical disk 2 along a guide shaft 3a (see FIG. 2A). When the optical pick-up 3 reaches the innermost periphery of the optical disk 2, the microcomputer 11 transmits a control signal to the spindle servo circuit 5 to drive the spindle motor 4 and rotate the optical disk 2 at a prescribed rotating speed (see FIG. 2B). Then, the microcomputer 11 transmits a control signal to the tracking servo circuit 8 and the focus servo circuit 9 to lead the focus of the optical pick-up 3 and the tracking of the optical pick-up and raise the operation of the optical pick-up 3. Then, when the out-of focus state is not detected and the out-of tracking state is not detected, the microcomputer 11 reads the information data recorded on the optical disk 2 by the optical pick-up 3 at a re-zero position where the optical pick-up 3 is raised. When the information data recorded on the optical disk 2 is not properly read, the microcomputer 11 transmits a control signal to the signal processing circuit 10 to change the setting value of an equalizer, that is, the setting value of a cut-off frequency of the equalizer or the setting value of a quantity of boost of the equalizer, repeatedly adjust the equalizer and adjust equalizer so as to properly read the information data recorded on the optical disk 2. Consequently, since the setting value of the equalizer can be changed to adjust the equalizer at the re-zero position where the operation of the optical pick-up 3 is raised without moving to a preset address. Accordingly, the setting value of the equalizer can be changed to rapidly adjust the equalizer even to a non-finalized disk in which the information data is not recorded in the preset address.

Further, when the information data recorded on the optical disk 2 is read at the re-zero position where the optical pick-up 3 is raised, if the out-of focus state of the optical pick-up 3 is detected, the microcomputer 11 transmits a control signal to the signal processing circuit 10 to change the setting value of the equalizer and adjust the equalizer. When the setting value of the equalizer is changed to adjust the equalizer, if the out-of focus state of the optical pick-up 3 is detected, the microcomputer 11 transmits a control signal to the focus servo circuit 9 to re-lead the focus of the optical pick-up 3. Then, the microcomputer 11 reads the information data recorded on the optical disk 2 by the optical pick-up 3. When the information data recorded on the optical disk 2 is not properly read, the microcomputer 11 transmits a control signal to the signal processing circuit 10 to change the setting value of the equalizer, repeatedly adjust the equalizer and adjust the equalizer so as to properly read the information data recorded on the optical disk 2.

Further, when the information data recorded on the optical disk 2 is read at the re-zero position where the optical pick-up 3 is raised, if the out-of-tracking state of the optical pick-up 3 is detected, the microcomputer 11 transmits a control signal to the tracking servo circuit 8 to re-lead the tracking of the optical pick-up 3 and discriminate whether or not the tracking of the optical pick-up 3 is re-led. When the tracking of the optical pick-up 3 is not re-led, the microcomputer 11 transmits a control signal to the signal processing circuit 10 to change the equalizer and adjust the equalizer. When the setting value of the equalizer is changed to adjust the equalizer, if the out-of-focus state of the optical pick-up 3 is detected, the microcomputer 11 transmits a control signal to the focus servo circuit 9 to re-lead the focus of the optical pick-up 3. Then, the microcomputer 11 reads the information data recorded on the optical disk 2 by the optical pick-up 3. When the information data recorded on the optical disk 2 is not properly read, the microcomputer 11 transmits a control signal to the signal processing circuit 10 to change the setting value of the equalizer, repeatedly adjust the equalizer and adjust the equalizer so as to normally read the information data recorded in the optical disk 2.

Further, the present invention is described in accordance with a flowchart showing the operation of the disk device according to one embodiment of the present invention.

When the disk device is loaded with the optical disk, the procedure advances from step S1 to step S2. In the step S2, the re-zero process is carried out for moving the optical pick-up to the innermost peripheral position of the optical disk. The optical disk is rotated at a prescribed rotating speed, the focus of the optical pick-up and the tracking of the optical pick-up are re-led and the operation of the optical pick-up is raised at the re-zero position. Then, the procedure advances to step S3.

In the step S3, whether or not the out-of focus state of the optical pick-up is detected is decided. When the out-of focus state of the optical pick-up is detected, the procedure advances to step S9. When the out-of focus state of the optical pick-up is not detected, the procedure advances to step S4.

In the step S4, whether or not the out-of tracking state of the optical pick-up is detected is decided. When the out-of-tracking state of the optical pick-up is detected, the procedure advances to step S5. When the out-of tracking state of the optical pick-up is not detected, the procedure advances to step S7.

In the step S5, the tracking of the optical pick-up is re-led and the procedure advances to step S6.

In the step S6, whether or not the tracking of the optical pick-up is re-led is decided. When the tracking of the optical pick-up is re-led, the procedure advances to the step S7. When the tracking of the optical pick-up is not re-led, the procedure advances to the step S9.

In the step S7, the information data recorded on the optical disk is read at the re-zero position where the optical pick-up 3 is raised and the procedure advances to step S8.

In the step S8, whether or not the information data recorded on the optical disk is normally read is decided. When the information data recorded on the optical disk is normally read, the procedure advances to step S14 to finish the procedure. When the information data recorded on the optical disk is not normally read, the procedure advances to the step S9.

In the step S9, the setting value of the equalizer of the signal processing circuit is changed to adjust the equalizer and the procedure advances to step S10.

In the step S10, whether or not the out-of-focus state of the optical pick-up is detected is decided. When the out-of-focus state of the optical pick-up is detected, the procedure advances to step S11. When the out-of-focus state of the optical pick-up is not detected, the procedure advances to step S12.

In the step S11, the focus of the optical pick-up is re-led and the procedure advances to the step S12.

In the step S12, whether or not the out-of-tracking state of the optical pick-up is detected is decided. When the out-of-tracking state of the optical pick-up is detected, the procedure advances to step S13. When the out-of-tracking state of the optical pick-up is not detected, the procedure returns to the step S3 to repeat the steps from the step S3.

In the step S13, the tracking of the optical pick-up is re-led, and the procedure returns to the step S3 to repeat the steps from the step S3.

What is claimed is:

1. A disk device for recording and reproducing information data on an optical disk, said disk device comprising:
   a rotating unit for rotating the optical disk at prescribed rotating speed;
   an optical pick-up for reading the information data recorded on the optical disk;
   a moving unit for moving the optical pick-up in the radial direction of the optical disk;
   a focus control unit for leading the focus of the optical pick-up to control the focus of the optical pick-up;
   a tracking control unit for leading the tracking of the optical pick-up to control the tracking of the optical pick-up; and
   an adjusting unit for repeatedly changing the setting value of an equalizer to adjust the equalizer so as to properly read the information data recorded on the innermost periphery of the optical disk when whether or not the information data is properly read is detected and when the information data is no properly read, wherein:
   when the optical disk is loaded on the disk device, the optical pick-up is moved to the innermost periphery of the optical disk, the optical disk is rotated at the prescribed rotating speed, the focus of the optical pick-up and the tracking of the optical pick-up are led, and the operation of the optical pick-up is raised; and
   when an out-of-focus state of the optical pick-up is detected, the focus of the optical pick-up is re-led, and when an out-of-tracking state of the optical pick-up is detected, the tracking of the optical pick-up is re-led and the setting value of the equalizer is changed to adjust the equalizer at a position where the operation of the optical pick-up is raised.

2. A disk device for recording and reproducing information data on an optical disk, the disk device comprising:
   a rotating unit for rotating the optical disk at prescribed rotating speed;
   an optical pick-up for reading the information data recorded on the optical disk;
   a moving unit for moving the optical pick-up in the radial direction of the optical disk;
   a focus control unit for leading the focus of the optical pick-up to control the focus of the optical pick-up;
   a tracking control unit for leading the tracking of the optical pick-up to control the tracking of the optical pick-up; and
   an adjusting unit for repeatedly changing the setting value of an equalizer to adjust the equalizer so as to properly read the information data recorded on the innermost periphery of the optical disk when whether or not the information data is properly read is detected and when the information data is not properly read, wherein:

when the optical disk is loaded on the disk device, the optical pick-up is moved to the innermost periphery of the optical disk, the optical disk is rotated at the prescribed rotating speed, the focus of the optical pick-up and the tracking of the optical pick-up are led, and the operation of the optical pick-up is raised; and the setting value of the equalizer is changed to adjust the equalizer at a position where the operation of the optical pick-up is raised.

3. The disk device according to claim 2, wherein when the out-of focus state of the optical pick-up is detected, the focus control unit re-leads the focus of the optical pick-up.

4. The disk device according to claim 2, wherein when the out-of tracking state of the optical pick-up is detected, the tracking control unit re-leads the tracking of the optical pick-up.

5. A control method for a disk device for recording and reproducing information data on an optical disk, the control method comprising:

moving the optical pick-up to the innermost periphery of the optical disk when the optical disk is loaded on the disk device;

rotating the optical disk at prescribed rotating speed;

leading the focus of the optical pick-up and the tracking of the optical pick-up to raise the operation of the optical pick-up, and repeatedly changing the setting value of an equalizer to adjust the equalizer at a position where the operation of the optical pick-up is raised so as to properly read he information data recorded on the innermost periphery of the optical disk when whether or not the information data is properly read is detected and when the information data is not properly read.

6. The control method for a disk device according to claim 5, further comprising:

re-leading the focus of the optical pick-up when the out-of focus state of the optical pick-up is detected.

7. The control method for a disk device according to claim 5, further comprising:

re-leading the tracking of the optical pick-up when the out-of tracking state of the optical pick-up is detected.

* * * * *